United States Patent [19]

Sandstrom et al.

[11] Patent Number: 5,605,951
[45] Date of Patent: Feb. 25, 1997

[54] SILICA REINFORCED RUBBER COMPOSTITION AND TIRE WITH TREAD THEREOF

[75] Inventors: Paul H. Sandstrom; Lawson G. Wideman, both of Tallmadge, Ohio

[73] Assignee: The Goodyear Tire & Rubber Company, Akron, Ohio

[21] Appl. No.: 604,141

[22] Filed: Feb. 20, 1996

[51] Int. Cl.[6] ............................... C08K 5/54; C08K 5/16; C08G 73/00

[52] U.S. Cl. ................ 524/494; 524/493; 524/492; 524/261; 524/262; 524/264; 524/267; 524/860; 524/874; 528/363; 528/364; 528/290; 528/291; 152/209 R

[58] Field of Search ................................ 524/494, 493, 524/492, 261, 262, 264, 267, 860, 874; 528/363, 364, 290, 291; 152/209 R

[56] References Cited

U.S. PATENT DOCUMENTS 5,391,820  2/1995  Woodbury et al. ................ 562/512

*Primary Examiner*—Paul R. Michl
*Assistant Examiner*—Olga Asinovsky
*Attorney, Agent, or Firm*—T. P. Lewandowski

[57] ABSTRACT

The present invention relates to a rubber composition containing silica reinforcement and to pneumatic tires having treads comprised of such rubber composition.

A rubber composition comprises at least one elastomer, silica, carbon black and a silica coupler comprised of 3,3'-tetrathiodipropionitrile polysulfide mixture.

18 Claims, No Drawings

SILICA REINFORCED RUBBER COMPOSTITION AND TIRE WITH TREAD THEREOF

FIELD

This invention relates to rubber compositions which contain silica reinforcement and to tires having treads thereof. In one aspect, the rubber composition is comprised of rubber, particularly sulfur cured rubber, reinforced with a combination of silica, and optionally carbon black, and a 3,3'-tetrathiodipropionitrile polysulfide mixture coupling agent.

BACKGROUND

For various applications utilizing rubber which require high strength and abrasion resistance, particularly applications such as tires and various industrial products, sulfur cured rubber is utilized which contains substantial amounts of reinforcing fillers, often in a range of about 35 to about 85 parts by weight per 100 parts rubber. Carbon black is commonly used for such purpose and normally provides or enhances good physical properties for the sulfur cured rubber. Particulate silica is also often used for such purpose, particularly when the silica is used in conjunction with a coupling agent. In some cases, a combination of silica and carbon black is utilized for reinforcing fillers for various rubber products, including treads for tires. The use of such reinforcing fillers for elastomers, including sulfur curable elastomers, is well known to those skilled in such art.

It is important to appreciate that, conventionally, carbon black is a considerably more effective reinforcing filler for rubber products, and particularly for rubber tire treads than silica if the silica is used without a coupling agent, or silica coupler or silica adhesion agent as it may be sometimes referred to herein.

Such coupling agents may, for example, be premixed, or pre-reacted, with the silica particles or added to the rubber mix during a rubber/silica processing, or mixing, stage. If the coupling agent and silica are added separately to the rubber mix during the rubber/silica mixing, or processing stage, it is considered that the coupling agent then combines in situ with the silica.

In particular, such coupling agents are sometimes composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In one aspect, the silane of the coupling agent apparently forms a bond to the silica surface and the rubber reactive component of the coupling agent combines with the rubber itself. Usually the rubber reactive component of the coupler is temperature sensitive and tends to combine with the rubber during the final and higher temperature sulfur vulcanization stage and, thus, subsequent to the rubber/silica/coupler mixing stage and, therefore, after the silane group of the coupler has combined with the silica. However, partly because of typical temperature sensitivity of the coupler, some degree of combination, or bonding, may occur between the rubber-reactive component of the coupler and the rubber during initial rubber/silica/coupler mixing stage(s) and, thus, prior to a subsequent vulcanization stage.

The rubber-reactive group component of such coupler might be, for example, one or more of groups such as mercapto, amino, vinyl, epoxy, and sulfur groups, and is often a sulfur or mercapto moiety and more usually sulfur.

Numerous coupling agents are taught for use in combining silica and rubber, such as, for example, silane based coupling agents containing a polysulfide component, or structure, such as, for example, trialkoxyorganosilane polysulfides containing from 2 to 8 sulfur atoms in a polysulfide bridge such as, for example, bis-(3-triethoxysilylpropyl)tetrasulfide and/or trisulfide.

Various U.S. patents relating to silicas and silica reinforced tire treads include, for example, U.S. Pat. Nos. 3,451,458; 3,664,403; 3,768,537; 3,884,285; 3,938,574; 4,482,663; 4,590,052; 5,089,554 and British 1,424,503.

The term "phr" if used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms "rubber composition", "compounded rubber" and "rubber compound" if used herein are used interchangeably to refer to "rubber which has been blended or mixed with various ingredients and materials" and such terms are well known to those having skill in the rubber mixing or rubber compounding art.

A reference to an elastomer's Tg refers to its glass transition temperature, which can conveniently be determined by a differential scanning calorimeter at a heating rate of 10° C. per minute.

SUMMARY AND PRACTICE OF THE INVENTION

In accordance with one aspect of this invention, a rubber composition is provided which comprises (A) 100 parts by weight of at least one diene-based elastomer, (B) about 25 to about 100, alternatively about 35 to about 90, phr of reinforcing filler composed of silica, preferably precipitated silica, and carbon black, and (C) a silica coupler selected from (i) 3,3'-tetrathiodipropionitrile polysulfide mixture containing from 2 to 8 sulfur atoms in a polysulfide bridge, or (ii) a combination of about 95 to about 25, alternatively about 90 to about 55, weight percent of such 3,3'-tetrathiodipropionitrile polysulfide mixture and, correspondingly, about 5 to about 75, alternatively about 10 to about 45, weight percent of bis-(3-trialkoxysilylalkyl) polysulfide containing from 2 to 8 sulfur atoms in the polysulfide bridge such as, for example, at least one of bis-(3-triethoxysilylpropyl)tetrasulfide and bis-(3triethoxysilylpropyl)trisulfide; wherein the weight ratio of silica to carbon black is at least 0.1/1, alternatively at least 3/1 and alternatively at least 10/1.

Typically, it is desired that the weight ratio of said silica coupler to silica is in a range of about 0.01/1 to about 0.2/1.

In one aspect of the invention, such a rubber composition is provided which is comprised of (A) 100 parts by weight of at least one diene-based elastomer, (B) about 25 to about 90 phr particulate, precipitated silica, (C) up to about 30 phr carbon black, and (D) a silica coupler which is collectively composed of about 90 to about 55 weight percent of said 3,3'-tetrathiodipropionitrile polysulfide mixture, about 5 to about 25 weight percent of at least one of bis-(3-triethoxysilylpropyl)tetrasulfide and bis-(3-triethoxysilylpropyl)trisulfide wherein the weight ratio of silica to carbon black is in a range of about 1 to about 30/1.

Typically, the precipitated silica is characterized by having a BET surface area in a range of about 50 to about 300 square meters per gram and a 10 dibutylphthalate (DBP) absorption value in a range of about 150 to about 300.

Typically, it is desired that the weight ratio of said silica coupler to silica is in a range of about 0.01/1 to about 0.2/1.

Thus, in one aspect of the invention, the rubber composition contains a combination of both silica and carbon black as elastomer reinforcing pigments.

The rubber composition may contain a minor amount of silica in its silica/carbon black or it may be quantitatively reinforced with silica where carbon black is present in a minor amount and the majority of the reinforcing filler is carbon black.

In another aspect of the invention, a tire is provided having a tread comprised of the said rubber composition of this invention.

The 3,3'-tetrathiodipropionitrile polysulfide mixture may more fully be described as a mixture of propionitrile sulfur-linked dimers having a di-nitrile functional group which is a highly unsaturated and reactive polar entity that possesses a polysulfidic chain containing from 2 to 8 sulfur atoms in a polysulfidic bridge having an average of about 3 to about 5 sulfur atoms per polysulfide bridge.

It is important to appreciate that the 3,3'-tetrathiodipropionitrile polysulfide is not a silane-based silica coupler.

It is believed that the 3,3'-tetrathiodipropionitrile polysulfide mixture acts to associate strongly to the silica through the polar nitrile group and, thus, couple the silica to the diene polymer by attachment of the rubber reactive polysulfidic end. This is considered herein to be beneficial because the silica coupling to the polymer is accomplished through strong ionic bonds.

Where it is desired that the rubber composition is primarily reinforced with silica as the reinforcing pigment, it is preferable that the weight ratio of silica to carbon black is at least 3/1, sometimes preferably at least 10/1 and, thus, for example, in a range of about 3/1 to about 30/1.

In one aspect of the invention, the silica coupler consists essentially of the 3,3'-tetrathiodipropionitrile polysulfidic mixture.

In a further aspect, the silica coupler can be composed of a combination of the 3,3'-tetrathiodipropionitrile polysulfidic mixture together with bis-(3-triethoxysilylpropyl)tetrasulfide and/or a blend of such tetrasulfide and bis-(3-triethoxysilylpropyl)trisulfide.

The 3,3'-tetrathiodipropionitrile polysulfide mixture can also be referred to as an associative nitrile coupler. In one aspect, it can also be referred to as a non-silane silica-to-rubber coupler. In particular, it can be characterized by having the properties of being a high boiling thick liquid with an infrared spectrometric absorption bond of medium intensity in a range of about $2260^{cm-1}$ to about $2240^{cm-1}$ for the nitrile.

Field desorption mass spectrometric analysis shows 3,3'-tetrathiodipropionitrile polysulfide mixture to be a polysulfidic mixture containing from 2 to 8 sulfur atoms in a polysulfidic bridge and the nominal average number of sulfur atoms in the polysulfide bridges is about 3 to about 5. Carbon 13 and proton NMR analysis show the methylene radicals between the polysulfidic bridges and the nitrile groups.

The 3,3'-tetrathiodipropionitrile polysulfide mixture is considered herein to be particularly advantageous for the practice of this invention because it has a very strong associative attraction to 10 silica and high reactivity for diene rubber which is considered to be a benefit to create what is considered herein to be an exceptionally good dispersion of silica into the rubber.

In one aspect, the 3,3'-tetrathiodipropionitrile polysulfide mixture can be prepared by allowing neat 3-chloropropionitrile (2 molar equivalents) to spontaneously react with one molar equivalent of hot aqueous sodium tetrasulfide solution in a two-phase reaction system. As a result, a polysulfide mixture is formed.

It is considered herein that, the more homogeneous the dispersion of rubber compound components into the rubber, in general, the better the resultant cured properties of that rubber. The 3,3'-tetrathiodipropionitrile's strong association to silica and high affinity, compatibility, and reactivity with rubber is considered herein to lead to relatively excellent silica dispersion.

In one aspect such a rubber composition can be provided as being sulfur cured. The sulfur curing is accomplished in a conventional manner, namely, by curing under conditions of elevated temperature and pressure for a suitable period of time.

In the practice of this invention, as hereinbefore pointed out, the rubber composition is comprised of at least one diene-based elastomer, or rubber. Thus, it i s considered that the elastomer is a sulfur curable elastomer. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, styrene/isoprene/butadiene terpolymer rubbers, and cis 1,4-polybutadiene rubber.

In one aspect particularly for tire treads, the rubber is preferably of at least two diene based rubbers.

The diene based rubbers may, for example, be of homopolymers and copolymers of conjugated diene hydrocarbons and copolymers of at least one diene hydrocarbon with a vinyl aromatic compound. Such diene hydrocarbons may be, for example, selected from 1,3-butadiene and isoprene. Such vinyl aromatic compound may be, for example, styrene or alphamethylstyrene For example, a combination of two or more rubbers is preferred such as at least elastomers selected from cis 1,4-polyisoprene rubber (natural or synthetic, although natural is preferred), 3,4-polyisoprene rubber, isoprene/butadiene rubber, styrene/isoprene/butadiene rubber, emulsion and solution polymerization derived styrene/butadiene rubbers, cis 1,4-polybutadiene rubber, medium vinyl polybutadiene rubber having a vinyl content of from 30 to 50, high vinyl polybutadiene having a vinyl content of from 50 to 75, and emulsion polymerization prepared butadiene/acrylonitrile copolymers.

In one aspect of this invention, an emulsion polymerization derived styrene/butadiene copolymer (E-SBR) might be used having a relatively conventional styrene content of about 20 to about 28 percent bound styrene or, for sol he applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50%. In one aspect, the E-SBR may also contain acrylonitrile to form a terpolymer rubber, as E-SBAR, in amounts, for example, of about to about 30 weight percent bound acrylonitrile in the terpolymer.

Emulsion polymerization prepared styrene/butadiene/acrylonitrile terpolymer rubbers containing about 2 to about 40 weight percent bound acrylonitrile in the terpolymer are also contemplated as diene based rubbers for use in this invention.

The solution polymerization prepared SBR (S-SBR) typically has a bound styrene content in a range of about 5 to about 50, preferably about 9 to about 36, percent. The S-SB can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition.

The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear.

Such BR can be prepared, for example, by organic solution polymerization of 1,3-butadiene.

The BR may be conveniently characterized, for example, by having at least a 90% cis 1,4-content.

The cis 1,4-polyisoprene and cis 1,4-polyisoprene natural rubber are well known to those having skill in the rubber art.

The vulcanize rubber composition should contain a sufficient amount of silica, and carbon black reinforcing filler (s) to contribute a reasonably high modulus and high resistance to tear. The combined weight of the silica and carbon black, as hereinbefore referenced, may be as low as about 30 parts per 100 parts rubber, but s preferably from about 35 or 45 to about 90 parts by weight.

The commonly employed siliceous pigments used as reinforcement in rubber compounding applications can be used as the silica in this invention, including pyrogenic and precipitated siliceous pigments (silica), although precipitated silicas are preferred.

The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface a tea is described in the *Journal of the American Chemical Society*, Volume 60, page 304 (1930).

The silica, as hereinbefore discussed, may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, Zeosil 1165MP and silicas available from Degussa AG with, for example, designations VN2 and VN3, etc.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antic antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of reinforcing type carbon blacks(s), for this invention, if used, are hereinbefore set forth. It is to be appreciated that the silica coupler may be used in conjunction with a carbon black, namely, pre-mixed with a carbon black prior to addition to the rubber composition, and such carbon black is to be included in the aforesaid amount of carbon black for the rubber composition formulation. Typical amounts of tackifier resins, if used comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from 2 to 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the 10 use of silica as a reinforcing filler in combination with 3,3'-tetrathiodipropionitrile polysulfide mixture as a coupling agent.

The presence and relative amounts of the above additives are not considered to be an aspect of the present invention which is more primarily directed to the utilization of specified blends of rubbers in rubber compositions, in combination with silica and with 3,3'-tetrathiodipropionitrile polysulfide mixture individually or in combination with bis-(3-triethoxysilylpropyl)tetrasulfide (a polysulfide mixture) as well as, optionally, carbon black, for the reinforcement of the rubber.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, silica and silica coupler, and carbon black if used, are mixed in one or more non-productive mix stages. The terms "non-productive" and "productive" mix stages are well known to those having skill in the rubber mixing art.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

In this Example, 3,3'-tetrathiodipropionitrile polysulfide mixture on a carbon black carrier was evaluated as an alternative for a relatively commonly used silica coupling agent, bis-(3-triethoxysilylpropyl)tetrasulfide polysulfide mixture on a carbon black as a carrier in a silica reinforced rubber composition.

The rubber compositions containing the materials set out in Table 1 were prepared in a BR Banbury rubber mixer using three separate, sequential stages of addition (mixing), namely, two non-productive mix stages and one final productive mix to temperatures of 160° C., 160° C. and 120° C. and times of 4 minutes, 4 minutes and 2 minutes, respectively. The amount of coupler is listed as being "variable" in Table 1 and is more specifically set forth in Table 2.

Sample 1 is a control without a silica coupler and Samples 2 and 3 contain the silica couplers.

It is clearly evident that utilization of the coupling agent appears to be necessary to obtain suitable cured properties in a silica containing rubber composition, or compound. Such properties include, for example, tensile strength at break, the 100 and 300% modulus values, rebound and hardness, Rheovibron E' and particularly DIN abrasion (lower values for the DIN abrasion test indicate less, or better, abrasion values). Samples 2 and 3, when compared to Sample 1, which was prepared in the absence of utilization of a silica coupling agent, clearly show the advantage of the coupling agents. The properties of Sample 3, which contains the silica coupler utilized in this invention has properties comparable to those exhibited by Sample 2 which contains the conventional silane coupling agent.

In particular, this Example shows that the 3,3'-tetrathiodipropionitrile polysulfide mixture, as utilized in Sample 3, has been observed to provide significant improvements in modulus, hardness and abrasion, with substantially equal rebound values, when compared to control Sample 1 which does not contain coupling agent. Such property values are predictive of a tire with a tread of such composition exhibiting similar rolling resistance with improved treadwear. Furthermore, these properties compare favorably to those of Sample 2 which contains the conventional silane coupling agent. This is considered significant because the 3,3'-tetrathiodipropionitrile is a lower cost material with an unlimited shelflife stability unlike the commercial bis-(3-triethoxysilylpropyl)tetrasulfide that has a very limited shelflife due to its high reactivity to moisture in the atmosphere.

TABLE 1

| 1st Non-Productive | |
|---|---|
| NAT 2200[1] | 100.00 |
| Carbon Black | 35.00 |
| Processing Oil | 5.00 |
| Zinc Oxide | 5.00 |
| Fatty Acid | 2.00 |
| Antioxidant[2] | 2.00 |
| 2nd Non-Productive | |
| Silica[3] | 15.00 |
| Bis-(3-triethoxysilylpropyl) tetrasulfide[4] | variable |
| 3,3'-tetrathiodipropionitrile polysulfide[5] | variable |
| Productive | |
| Sulfur | 1.40 |
| Accelerator, sulfenamide type | 1.00 |

[1]synthetic cis 1,4-polyisoprene from The Goodyear Tire & Rubber Company;
[2]of the polymerized 1,2-dihydro-2,2,4-trimethylquinoline type;
[3]silica obtained as Hi-Sil-210 from PPG Industries, Inc.;
[4]50% active composite composed of the organosilane tetrasulfide on or with carbon black in a 50/50 weight ratio available as material X50S from Degussa GmbH. Technically the organosilane polysulfide is understood to be a composite, or mixture, in which the average polysulfide bridge contains about 3.5 to 4 connecting sulfur atoms, although the mixture may contain such polysulfides with about 2 to 8 connecting sulfur atoms.
[5]3,3'-tetrathiodipropionitrile polysulfide mixture obtained as a highly viscous liquid from the reaction of two molar equivalents of 3-chloropropionitrile with one molar equivalent of aqueous sodium tetrasulfide. Such polysulfide is considered herein to contain about 2 to about 8 sulfur atoms in its polysulfide bridges with a nominal average of about 3 to about 5 sulfur atoms per sulfur bridge as determined by field desorption mass spectrometry and carbon-13/proton NMR analysis. It is supported 1 to 1 by weight on GPT carbon black (N330), by being deposited on the carbon black by the process of incipient wetness in acetone, for all examples used in this specification. The term "incipient wetness" means that no more solvent is used to dissolve the 3,3'-tetrathiodipropionitrile than is needed to completely cover the carbon black; subsequent reduced-pressure stripping of the solvent while rotating or agitating the carbon black slurry, thus, giving a dry, friable carbon black containing about 50% by weight of the dipropionitrile homogeneously dispersed on its surface. It is believed that this term is well known to those having skill in such art.

TABLE 2

| Sample # | 1 | 2 | 3 |
|---|---|---|---|
| X50S (Degussa GmbH) | 0 | 3 | 0 |
| 3,3'-tetrathiodipropionitrile polysulfide | 0 | 0 | 2 |
| Rheometer (150° C.) | | | |
| Max. Torque, dNm | 30.2 | 34.3 | 33.5 |
| Min. Torque, dNm | 7.0 | 7.0 | 7.0 |
| Delta Torque | 23.2 | 27.3 | 26.5 |
| T$_{90}$, minutes | 23.0 | 18.7 | 15.5 |
| Stress-Strain | | | |
| Tensile Strength, MPa | 17.6 | 19.7 | 18.5 |
| Elongation at Break, % | 630 | 621 | 565 |
| 100% Modulus, MPa | 1.2 | 1.7 | 1.5 |
| 300% Modulus, MPa | 5.5 | 8.0 | 6.7 |
| Rebound | | | |
| 100° C., % | 55.1 | 59.8 | 55.0 |
| Hardness | | | |
| Shore A, 100° C. | 46.4 | 53.7 | 51.0 |
| Rheovibron | | | |
| E' at 60° C., MPa | 10.6 | 11.5 | 12.3 |
| Tan Delta at 60° C. | 0.105 | 0.092 | 0.101 |
| DIN Abrasion | 231 | 156 | 172 |

EXAMPLE II

In this Example, 3,3'-tetrathiodipropionitrile polysulfide mixture on a carbon black carrier was evaluated as an alternative for bis-(3-triethoxysilylpropyl)tetrasulfide polysulfide mixture on a carbon black as a carrier in a silica reinforced rubber composition.

The rubber compositions containing the materials set out in Table 3 were prepared in a BR Banbury rubber mixer using three separate, sequential stages of addition (mixing), namely, two non-productive mix stages and one final productive mix to temperatures of 160° C., 160° C. and 120° C. and times of 4 minutes, 4 minutes and 2 minutes, respectively. The amount of coupler and sulfur and accelerator are listed as being "variable" in Table 3 and is more specifically set forth in Table 4.

It is clearly evident that utilization of the coupling agent appears to be necessary to obtain suitable cured properties in a rubber composition, or compound containing 35 phr silica and 15 phr carbon black. Such properties include 100 and 300% modulus values, rebound and hardness, Rheovibron E' and DIN abrasion (lower values mean better abrasion resistance). Sample 2, when compared to Sample 1, which was prepared in the absence of utilization of a silica coupling agent, clearly show the advantage of the coupling agent.

In particular, this Example shows that the 3,3'-tetrathiodipropionitrile polysulfide mixture, as utilized in Sample 2, have been observed to provide significant improvements in modulus, hardness and abrasion when compared to control Sample 1 which does not contain the coupling agent. For the rubber composition of Sample 2, such property improvements are predictive, for a tire with a tread of such rubber composition, of improved treadwear.

TABLE 3

| | |
|---|---|
| 1st Non-Productive | |
| NAT 2200[1] | 100.00 |
| Carbon Black | 15.00 |
| Silica[3] | 20.00 |
| Processing Oil | 5.00 |
| Zinc Oxide | 5.00 |
| Fatty Acid | 2.00 |
| Antioxidant[2] | 2.00 |
| 2nd Non-Productive | |
| Silica[3] | 15.00 |
| 3,3'-tetrathiodipropionitrile polysulfide[4] | variable |
| Productive | |
| Sulfur | variable |
| Accelerator, sulfenamide type | variable |
| Accelerator, diphenylguanidine (DPG) | variable |

[1]synthetic cis 1,4-polyisoprene from The Goodyear Tire & Rubber Company;
[2]of the polymerized 1,2-dihydro-2,2,4-trimethylquinoline type;
[3]silica obtained as Hi-Sil-210 from PPG Industries, Inc.;
[4]3,3'-tetrathiodipropionitrile polysulfide mixture as used in Table 1.

TABLE 4

| Sample # | 1 | 2 |
|---|---|---|
| Sulfur | 1.5 | 2 |
| Sulfenamide accelerator | 2 | 2.5 |
| DPG | 0.5 | 1.0 |
| 3,3'-tetrathiodipropionitrile polysulfide | 0 | 3 |
| Rheometer (150° C.) | | |
| Max. torque, dNm | 40.3 | 48.3 |
| Min. torque, dNm | 8.2 | 5.3 |
| Delta torque | 32.1 | 43.0 |
| $T_{90}$, minutes | 19.5 | 8.5 |
| Stress-Strain | | |
| Tensile strength, MPa | 8.5 | 15.9 |
| Elongation at break, % | 673 | 525 |
| 100% modulus, MPa | 1.3 | 2.1 |
| 300% modulus, MPa | 4.4 | 7.2 |
| Rebound | | |
| 100° C., % | 61.1 | 62.5 |
| Hardness | | |
| Shore, 100° C. | 54.2 | 64.1 |
| Rheovibron | | |
| E' at 60° C., MPa | 14.4 | 22.6 |
| Tan Delta at 60° C. | .076 | .050 |
| DIN abrasion | 221 | 196 |

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition comprised of (A) 100 parts by weight of at least one diene-based elastomer, (B) about 25 to about 100 phr of filler composed of particulate, precipitated silica and carbon black, and (C) a silica coupler selected from (i) 3,3'-tetrathiodipropionitrile polysulfidic mixture containing 2 to 8 sulfur atoms per polysulfidic bridge or from (ii) a combination of about 95 to about 25 weight percent 3,3'-tetrathiodipropionitrile polysulfide mixture and, correspondingly, about 5 to about 75 weight percent of bis-(3-trialkoxysilylalkyl) polysulfide containing from 2 to 8 sulfur atoms in its polysulfide bridge wherein the weight ratio of said silica coupler to silica is in a range of about 0.01/1 to about 0.2/1; wherein the weight ratio of silica to carbon black, is at least about 0.1/1.

2. The rubber composition of claim 1 wherein the said silica coupler consists essentially of 3,3'-tetrathiodipropionitrile polysulfidic mixture; and wherein the weight ratio of said silica coupler to silica is in a range of about 0.01/1 to about 0.2/1.

3. The rubber composition of claim 1 where the 3,3'-tetrathiodipropionitrile polysulfidic mixture is supported on a carbon black carrier.

4. The rubber composition of claim 1 wherein the said silica coupler is a combination of about 95 to about 25 weight percent 3,3'-tetrathiodipropionitrile polysulfidic mixture and, correspondingly, about 5 to about 75 weight percent of bis-(3-triethoxysilylpropyl)tetrasulfide and bis-(3-triethoxysilylpropyl)trisulfide.

5. The rubber composition of claim 1 wherein the diene based elastomer is selected from at least one of cis 1,4-polyisoprene rubber, 3,4-polyisoprene rubber, styrene/butadiene copolymer rubbers, isoprene/butadiene rubber, styrene/isoprene/butadiene terpolymer rubbers, cis 1,4-polybutadiene rubber, medium vinyl polybutadiene rubber, high vinyl polybutadiene rubber and emulsion polymerization prepared styrene/butadiene/acrylonitrile terpolymer rubber and butadiene/acrylonitrile copolymer rubber.

6. The rubber composition of claim 1 wherein the silica is characterized by having a BET surface area in a range of about 50 to about 300 square meters per gram and a dibutylphthalate (DBP) absorption value in a range of about 150 to about 300.

7. The rubber composition of claim 2 wherein the silica is characterized by having a BET surface area in a range of about 50 to about 300 square meters per gram and a dibutylphthalate (DBP) absorption value in a range of about 150 to about 300.

8. The rubber composition of claim 3 wherein the silica is characterized by having a BET surface area in a range of about 50 to about 300 square meters per gram and a dibutylphthalate (DBP) absorption value in a range of about 150 to about 300.

9. A rubber composition comprised of (A) 100 parts by weight of at least one diene-based elastomer, (B) about 25 to about 90 phr particulate silica, (C) up to about 30 phr carbon black, and (D) a silica coupler which is collectively composed of about 90 to about 55 weight percent 3,3'-tetrathiodipropionitrile polysulfidic mixture, about 10 to about 45 weight percent of bis-(3-triethoxysilylpropyl)tetrasulfide and bis-(3-triethoxysilylpropyl)trisulfide wherein the weight ratio of said silica coupler to silica is in a range of about 0.01/1 to about 0.2/1; wherein the weight ratio of silica to carbon black is in a range of about 3/1 to about 30/1; wherein the silica is characterized by having a BET surface area in a range of about 50 to about 300 square meters per gram and a dibutylphthalate (DBP) absorption value in a range of about 150 to about 300.

10. A tire having a rubber tread wherein said tread is comprised of the rubber composition of claim 1.

11. A tire having a rubber tread wherein said tread is comprised of the rubber composition of claim 2.

12. A tire having a rubber tread wherein said tread is comprised of the rubber composition of claim 3.

13. A tire having a rubber tread wherein said tread is comprised of the rubber composition of claim 4.

14. A tire having a rubber tread wherein said tread is comprised of the rubber composition of claim 5.

15. A tire having a rubber tread wherein said tread is comprised of the rubber composition of claim 6.

16. A tire having a rubber tread wherein said tread is comprised of the rubber composition of claim 7.

17. A tire having a rubber tread wherein said tread is comprised of the rubber composition of claim 8.

18. A tire having a rubber tread wherein said tread is comprised of the rubber composition of claim 9.

\* \* \* \* \*